(12) United States Patent
Vanhoye et al.

(10) Patent No.: US 6,242,549 B1
(45) Date of Patent: *Jun. 5, 2001

(54) COMPOSITION BASED ON A DICYCLOPENTENYLOXYALKYL ESTER OF (METH) ACRYLIC ACID AND ITS APPLICATIONS IN THE BUILDING SECTOR

(75) Inventors: Didier Vanhoye; Martine Cerf, both of Bernay; Yves Barbier, Pontpoint; Mieczyslaw Wnuk, Sainte Marguerite en Ouche, all of (FR)

(73) Assignee: Elf Atochem, S.A. (FR)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/632,081

(22) Filed: Apr. 15, 1996

(30) Foreign Application Priority Data

Apr. 13, 1995 (FR) .................................................. 95 04466

(51) Int. Cl.$^7$ ............................. C08L 33/04; C08L 33/06; C08K 5/00

(52) U.S. Cl. .......................... 526/283; 526/213; 526/217; 526/228; 525/404; 524/493; 524/425; 524/426; 524/442; 524/444

(58) Field of Search .................................. 526/228, 283, 526/217, 213; 427/407.1; 525/404; 524/493, 425, 426, 442, 444

(56) References Cited

U.S. PATENT DOCUMENTS

| | | | |
|---|---|---|---|
| 5,098,973 | 3/1992 | Kozuka et al. | 526/282 |
| 5,387,661 | * 2/1995 | Frost | 526/90 |
| 5,565,535 | * 10/1996 | Costin et al. | 526/240 |
| 5,567,788 | * 10/1996 | Zezza | 526/90 |
| 5,712,337 | * 1/1998 | Dischö | 524/496 |
| 5,721,326 | * 2/1998 | Frost | 526/283 |

FOREIGN PATENT DOCUMENTS

| | | |
|---|---|---|
| 0 047 120 | 3/1982 | (EP) . |
| 0 419 657 | 4/1991 | (EP) . |

* cited by examiner

Primary Examiner—Donald R. Wilson
(74) Attorney, Agent, or Firm—Millen, White, Zelano, & Branigan, P.C.

(57) ABSTRACT

This composition, which is useful as a binder in the preparation of synthetic resin concretes or mortars, bonding primers or finishing coats, comprises (A) a system of monomers comprising: (a1) 50–90 parts of a dicyclopentenyloxyalkyl eater:

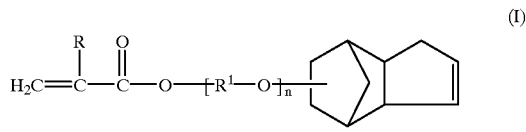

(I)

where R=H or $CH_3$; n=1 or 2; and $R^1$=$C_2$–$C_6$ alkylene; (a2) 0–25 parts of at least one heavy (meth)acrylate giving a homopolymer with a Tg higher than that of a homopolymer of (a1); (a3) 0–25 parts of at least one heavy (meth)acrylate giving a homopolymer with a Tg lower than that of a homopolymer of (a1); (a4) 0–25 parts of at least one monomer containing at least two (meth)acrylic unsaturations; and (B) 5–30 parts of at least one poly(allyl glycidyl ether); and (C) an initiating system chosen from (C1) to (C4): (C1) 0.1–3 parts of at least one organic peroxide derived from a $C_3$–$C_{18}$ hydrocarbon compound and 0.1–2 parts of at least one aromatic amine; (C2) 0.1–3 parts of at least one organic hydroperoxide derived from a $C_3$–$C_{18}$, hydrocarbon compound and 0.0005–2 parts of at least one polyvalent metal salt; (C3): (C1) +0.0005–2 partsof at least one polyvalent metal salt; and (C4): (C1)+(C2), all the amounts being given by weight per 100 parts by weight of (A)+(B).

28 Claims, No Drawings

COMPOSITION BASED ON A DICYCLOPENTENYLOXYALKYL ESTER OF (METH) ACRYLIC ACID AND ITS APPLICATIONS IN THE BUILDING SECTOR

BACKGROUND OF THE INVENTION

The present invention relates to a composition based on a dicyclopentenyloxyalkyl ester of (meth)acrylic acid, the said composition being intended to be used in the building sector, as binder in the preparation of synthetic resin concretes or mortars, or as bonding primer, or alternatively as finishing coat, in which case the composition can contain one or more pigments in order to obtain the desired final colour.

The development of floorings based on methyl methacrylate resin concretes or mortars has made it possible to be able to carry out construction operations under temperature conditions close to 0° C., conditions under which epoxy- or polyurethane-based systems are inoperative. Moreover, the low viscosity of this monomer introduces the advantage of thoroughly filling the spaces and cracks, thus improving the mechanical behaviour. However, the major disadvantages of the use of methyl methacrylate are its odor, its low ignition point and its high shrinkage.

With the aim of reducing these disadvantages, the use of a particular methacrylic monomer, namely dicyclopentenyloxyethyl methacrylate (DCPOEMA), has been proposed in Patents U.S. Pat. No. 4,299,761, EP-A-47,120, U.S. Pat. No. 4,400,413 and U.S. Pat. No. 4,460,625. This monomer, which has a high boiling point and which carries two double bonds of different natures and reactivities, in fact possesses a very slight odor and results in shrinkage which is markedly less than that of methyl methacrylate.

The use having a monomers of high boiling point and a high molar mass poses, however, problems of limitation of the rate of surface polymerization due to inhibition by atmospheric oxygen which is reflected by the persistence of a stickiness for a period of time ranging up to more than 24 hours. These problems are particularly evident when DCPOEMA and analogous monomers are used.

In accordance with the abovementioned patents, this problem can be solved by covering the surface with an immiscible liquid which forms a barrier to oxygen and which can contain a polymerization initiator. This solution nevertheless brings with it the disadvantage of causing the appearance of the fillers at the surface and of reducing the chemical resistance of the material.

It is also known that the use of salts or complexes of transition metals, such as cobalt, manganese and zirconium, commonly called drying agents, makes it possible to reduce the curing time of the surface without, however, falling below 8 hours. In order to increase the drying rate and to decrease the water gain, it is also possible to incorporate unsaturated fatty acids as described in European Patent Application EP-A-157,596. However, this improvement in the drying time still does not make it possible to obtain a time during which stickiness is displayed which is less than 6–8 hours. In order to inhibit the effect of oxygen, reducing agents, such as aldehydes and imines, can be added at the time of polymerization, as described in European Patent Application EP-A-169,702, with, however, the disadvantages of a possible premature oxidation of the aldehyde and of the necessity of the presence of water in order to open the imine functional group (blocked aldehyde functional group).

The development of synthetic resin concretes based on dicyclopentenyloxyethyl methacrylate and analogous compounds thus requires new solutions in order to solve the technical problems related to the low rate of drying of the coating.

Moreover, this market also demands materials exhibiting improved thermal resistance and good resistance to chemical agents, such as acids, bases and solvents.

SUMMARY OF THE INVENTION

It has now been discovered that, surprisingly, the use of poly(allyl glycidyl ether)s for activating the polymerization of dicyclopentenyloxyethyl methacrylate and of analogous monomers made it possible to obtain binders for synthetic resin mortars or concretes which exhibit an improved drying time and floorings exhibiting, only 2 to 4 hours after application, a hard, dry, smooth and impermeable surface which is resistant to weathering and chemical attacks and which exhibits a very marked improvement with respect to the prior state of the art.

The use of poly(allyl glycidyl ether)s in binder compositions for concrete or mortars or bonding primer compositions or finishing coat compositions, mostly composed of dicyclopentenyloxyalkyl (meth)acrylate or analogous compounds, is not known to date:

PRIOR ART

J. W. Knapczyk, "Journal of Coating Technology", Vol. 60, No. 756, January 1988, pages 63 to 72, has described the acceleration in the formation of films of pentaerythritol triacrylate, of dipentaerythritol hydroxypentaacrylate, of trimethylolpropane triacrylate, of acrylate urethane, of epoxy acrylate, of tetraethylene glycol diacrylate and of hexanediol diacrylate, under the effect of poly(allyl glycidyl ether)s. W. Demarteau and J. M. Loutz, "Double Liaison—Chimie des Peintures" [Double Bond—Chemistry of Paints], No. 411–412, January–February 1990, pages 11/29 to 34/16, have shown that it is possible to cure prepolymers carrying acrylate functional groups (acrylate polyesters, ethoxyacrylates, acrylate urethanes) by a chain mechanism using initiators which are generators of free radicals, provided that a poly(allyl glycidyl ether) is added to the formulations. E. S. Jensen et al., "Journal of Applied Polymer Science", Vol. 42, 2681–2689 (1991), pages 2681–2689, have shown that poly(allyl glycidyl ether) resins, in combination with an initiator and a catalyst, promote the curing of multifunctional acrylates in the presence of air, without achieving thereby the same result as in the absence of air.

However, it could not be deduced from the above described prior art that the incorporation of poly(allyl glycidyl ether)s in formulations based on dicyclopentenyloxyalkyl (meth)acrylate and analogous compounds would make possible such a fast reaction, resulting in an extremely rapid disappearance of the stickiness ("tack") at the surface. In fact, the rate of polymerization of DCPOEMA is markedly slower in the presence of air than that of multifunctional monomers. Moreover, it is well known that the rate of polymerization of multifunctional monomers is faster than that of monofunctional monomers (the allylic double bond of DCPOEMA does not participate in the polymerization but in the subsequent crosslinking by treatment with drying agent(s)). However, for multi-functional (meth)acrylates, this higher reactivity is accompanied by a high level of residual monomers due to the gelling of the mixture by establishment of a three-dimensional network, which results in a residual "tack". In this context, the use of poly(allyl glycidyl ether)s as secondary initiators makes it possible to greatly decrease the content of residual monomers.

In the case of DCPOEMA and analogous monomers, the poly(allyl glycidyl ether)s intervene more in trapping atmospheric oxygen and preventing the formation of low molecular weight oxygen-containing oligomers, the rate of polymerization of DCPOEMA and analogous compounds not being limited.

Moreover, it has been observed that poly(allyl glycidyl ether)s result, in the case of the present invention, in resin concretes which are less rigid and in coats which are more flexible.

A subject of the present invention is therefore first a composition intended to be used as a binder in the preparation of synthetic resin concretes or mortars or as bonding primer or as finishing coat, characterized in that it comprises:

(A) a system of monomers comprising:
(a1) 50 to 90 parts by weight of a dicyclopentenyloxyalkyl ester of formula (I):

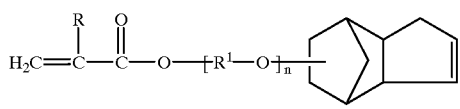

(I)

in which
R represents H or $CH_3$;
n has the value 1 or 2; and
$R^1$ represents a $C_2$–$C_6$ alkylene group;
(a2) 0 to 25 parts by weight of at least one heavy (meth)acrylate giving a homopolymer in which the glass transition temperature is higher than the glass transition temperature of a homopolymer of the ester (a1);
(a3) 0 to 25 parts by weight of at least one heavy (meth)acrylate giving a homopolymer in which the glass transition temperature is lower than the glass transition temperature of a homopolymer of the ester (a1);
(a4) 0 to 25 parts by weight of at least one monomer having at least two (meth)acrylic unsaturations; and
(B) 5 to 30 parts by weight of at least one poly(allyl glycidyl ether); and
(C) an initiating system chosen from the following systems (C1) to (C4):
(C1) 0.1 to 3 parts by weight of at least one organic peroxide derived from a $C_3$–$C_{18}$ hydrocarbon compound and 0.1 to 2 parts by weight of at least one aromatic amine;
(C2) 0.1 to 3 parts by weight of at least one organic hydroperoxide derived from a $C_3$–$C_{18}$ hydrocarbon compound and 0.0005 to 2 parts by weight of at least one polyvalent metal salt;
(C3) a mixture of (C1) and of 0.0005 to 2 parts by weight of at least one polyvalent metal salt; and
(C4) a mixture of (C1) and (C2), all the amounts being given per 100 parts by weight of (A)+(B).

The preferred ester (a1) is dicyclopentenyloxyethyl methacrylate.

The heavy (meth)acrylates (a2) are intended to enhance the hardness of the composition after polymerization; as for the heavy methacrylates (a3), these act as internal plasticizers.

The heavy (meth)acrylates (a2) are in particular chosen from isobornyl methacrylate, isobornyl acrylate and tert-butylcyclohexyl methacrylate; and the heavy (meth) acrylates (a3) are in particular chosen from ethyltriglycol methacrylate, lauryl acrylate, stearyl acrylate, nonyl methacrylate, nonyl acrylate, lauryl methacrylate and stearyl methacrylate, those which are preferred being (meth) acrylates possessing a linear or branched alkyl chain having 12 or more than 12 carbon atoms.

The monomers (a4) are intended to enhance the mechanical behaviour of the material: compressive strength, resistance to abrasion, and the like; generally, any crosslinking agent conventionally used in the (meth)acrylate series is suitable and they are chosen in particular from trimethylolpropane trimethacrylate, trimethylolpropane triacrylate, bisphenol A dimethacrylate, butanediol dimethacrylate, hexanediol dimethacrylate, tripropylene glycol dimethacrylate and the dimethacrylate of bisphenol A diglycidyl ether, and preferably trimethylolpropane trimethacrylate.

The poly(allyl glycidyl ether)s (B) are advantageously chosen from those exhibiting vapour pressures which are sufficiently low for the resulting composition to be substantially odourless.

Mention may be made, as examples of poly(allyl glycidyl ether)s (B), of those represented by the following formulae (II), (III) and (IV):

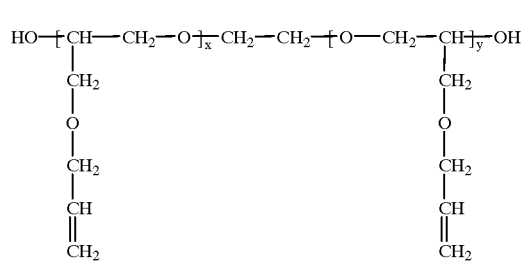

(II)

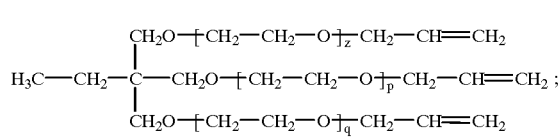

(III)

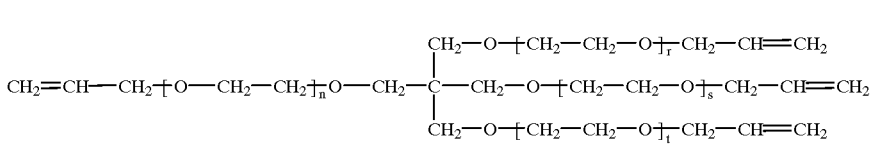

in which x, y, z, p, q, r, s and t each represent an integer from 2 to 10 inclusive.

These oligomers (B), because of their easily peroxidizable allylic functional groups, act as an initiator and as a crosslinking agent. They also make it possible to greatly reduce the inhibition by atmospheric oxygen, which makes it possible to maintain a rate of surface polymerization which is sufficient to decrease, in the case of a coat as well as on the surface of the concrete (without specific coats), the stickiness in the period of time which follows the placing of the said coat or of the said concrete.

Mention may be made, among the organic peroxides forming part of the formulation of the initiating systems (C1), (C3) and (C4), of dibenzoyl peroxide, tert-butyl perbenzoate, 2,2-bis(tert-butylperoxy)butane and tert-butylperoxy isopropyl carbonate; and mention may be made, among the hydroperoxides which form part of the formulation of the initiating systems for (C2) and for (C4), of cumene hydroperoxide, tert-butyl hydroperoxide, methyl ethyl ketone hydroperoxide and 2,5-dimethyl- 2,5-bis(hydroperoxy)hexane. The aromatic amines forming part of the formulation of the initiating systems (C1), (C3) and (C4) can be chosen from N,N-dimethylaniline, N,N-dimethyl-para-toluidine and para-(N,N-dimethylamino)-benzaldehyde. As regards the polyvalent metal salts which form part of the formulation of the initiating systems (C2), (C3) and (C4), these are in particular salts of heavy $C_4$–$C_{30}$ carboxylic acids; mention may be made in particular of the naphthenates and octoates of cobalt(II), of potassium, of calcium, of zirconium, of nickel or of manganese, and their mixtures.

The composition according to the invention, the individual constituents of which have just been described, is advantageously provided in the form of a two-component system in which the components have to be mixed at the time of use. Preferably, one of the components is composed of the system of monomers (A) and of the tertiary amine(s) and/or the metal salt(s) of the initiating system (C), and the other component of the poly(allyl glycidyl ether)s (B) and of the peroxide(s) and/or the hydroperoxide(s) of the initiating system (C).

The present invention also relates to a synthetic resin mortar or concrete composition comprising inert inorganic fillers and a binder, the latter having the composition defined above. Generally, such a composition comprises, per 100 parts by weight:

10 to 25 parts of the said composition according to the invention forming the binder; and
90 to 75 parts of the said fillers.

The latter have a particle size generally of between 100 $\mu$m and 9.5 mm. However, the particle size distribution of the said fillers is most often studied in order to minimize voids, so as to use a minimum amount of monomers in order to decrease the cost and the shrinkage. The fillers are in particular chosen from sand, gravel, silica, calcium carbonate and Portland cement.

The present invention also relates to a self-levelling resin mortar or concrete obtained from the mortar or concrete composition as defined above.

The synthetic resin mortar or concrete according to the invention is prepared by mixing the monomers and the initiators described above which prefigure the binder with the inorganic fillers, according to techniques which are well known to the person skilled in the art. It is possible, for example, to prepare a formulation containing the poly(allyl glycidyl ether), the peroxides and/or hydroperoxides and the fillers and to mix this formulation with the remainder of the constituents of the binder composition. The preparation is carried out under the temperature conditions commonly encountered on work sites: −10 to +50° C., without any specific problem. The amount of activator (tertiary amine and polyvalent metal salt) can be modified on site, if appropriate, in order to obtain the desired setting time. According to the application envisaged, the mixture can be poured into a mould, in order to produce panels, slabs or the like, or can be poured directly onto the floor to be repaired or to be covered, application taking place, in this case, by manual or mechanical floating, in order to obtain a thickness generally of between 1 and 50 mm.

According to the present invention, a self-levelling resin concrete is obtained which does not exhibit an unpleasant odor and which cures during times of 5 to 60 minutes at the core and from 2 to 4 hours at the surface, instead of 15 to 75 minutes at the core and 8 to 24 hours at the surface for systems without poly(allyl glycidyl ether)s.

The present invention also relates to a bonding primer composition, which comprises the composition as defined above (without the fillers), and to a finishing coat composition, intended to be applied in particular on concretes or porous materials and which comprises the composition as defined above (without the fillers), if appropriate as a mixture with at least one inorganic or organic pigment, the pigment(s) being present in the usual proportions.

Finally, the present invention relates to a flooring, applied in particular on a hydraulic concrete floor, characterized in that it comprises the sequence of the following three layers:

a first bonding layer, obtained from the primer composition according to the invention, applied in a thickness of approximately 0.1 to 0.5 mm;

a second synthetic resin concrete layer, obtained from the concrete composition according to the invention, applied in a thickness of approximately 1 to 50 mm; and a third finishing layer, obtained from the coating composition according to the invention, applied in a thickness of approximately 0.2 to 0.5 mm.

This last finishing layer is particularly important for the food industry sectors, because it makes possible better cleaning of surfaces, preventing proliferation of bacteria in the pores of the coat. Moreover, it provides the coat with a more attractive aesthetic appearance.

The following non-limiting Examples are given in order to give a better illustration of the subject of the invention. In these Examples, the parts are parts by weight.

EXAMPLE 1

The following formulations (A) and (B) are prepared, which formulations are intended to be mixed at the time of use in order to form a synthetic resin concrete.

| Formulation (A) | |
|---|---|
| • Dicyclopentenyloxyethyl methacrylate | 160 parts |
| • Cobalt naphthenate (at 100% by weight) | 1.06 parts |
| • N,N-Dimethyl-para-toluidine | 1.0 part |
| Formulation (B) | |
| • Poly(allyl glycidyl ether) of formula: | 40 parts |

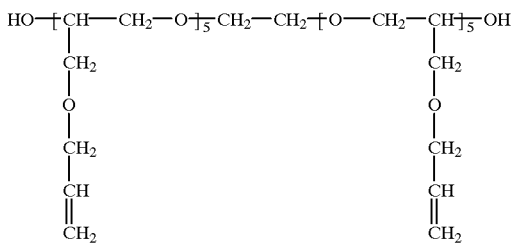

| | |
|---|---|
| marketed by the Company Monsanto under the name "Santolink XI 100" | |
| • Dibenzoyl peroxide (75% strength by weight) | 6 parts |
| • Inorganic fillers compound composed of sand, gravel and silica flour | 1800 parts |

At the time of use, the formulations (A) and (B) are mixed in order to form the concrete which is spread, using a float, as a layer with a thickness of 5 mm over a hydraulic concrete floor covered with an adhesion primer.

Setting remains after 10–15 minutes at 20° C. and results in a dry surface 3 hours after laying.

EXAMPLE 2 (Comparative)

Example 1 is reproduced, except that 200 parts of dicyclopentenyloxyethyl methacrylate are used and that poly(allyl glycidyl ether) is not used.

In the same way, a setting time of approximately 10 minutes is obtained but the stickiness of the surface persists for up to 24 hours.

EXAMPLES 3 to 6

Various formulations (A) below are prepared which are intended to be mixed at the time of use with a formulation (B), also shown below, in order to form synthetic resin concretes.

| Formulation (A) | |
|---|---|
| Dicyclopentenyloxyethyl methacrylate (DCPOEMA) | X parts (see Table below) |
| Comonomer chosen from trimethylolpropane trimethacrylate (TMPTMA), isobornyl methacrylate (ISOBORMA) and nonyl methacrylate (NONMA) | Y parts (see Table below) |
| Cobalt naphthenate (8% strength by weight) | 0.78 part |
| N,N-Dimethyl-para-toluidine | 0.1 part |
| Formulation (B) | |
| Poly(allyl glycidyl ether) of Example 1 | 5 parts |
| Benzoyl peroxide (75% strength by weight) | 0.33 part |
| Cumene hydroperoxide (80% strength by weight) | 0.31 part |
| Inorganic fillers composed of sand, gravel and silica flour | 75 parts |

At the time of use, the formulations (A) and (B) are mixed in order to form the concrete which is spread, using a float, as a layer with a thickness of 5 mm over a hydraulic concrete covered with an adhesion primer. The beginning and end of setting, as well as the TFT ("tack-free time") period necessary for obtaining a dry surface, are specified in the following Table 1 for the four different combinations.

TABLE 1

| EXAMPLES | 3 | 4 | 5 | 6 |
|---|---|---|---|---|
| DCPOEMA (X parts) | 20 | 15 | 15 | 15 |
| TMPTMA (Y parts) | | 5 | | |
| ISOBORMA (Y parts) | | | 5 | |
| NONMA (Y parts) | | | | 5 |
| Beginning of setting at 20° C. in minutes | 12 | 10 | 12 | 16 |
| End of setting at 20° C. (in minutes) | 45 | 30 | 48 | 55 |
| TFT (in hours) | 2 h 40 min | 3 h 00 min | 2 h 25 min | 3 h 50 min |

EXAMPLES 7 to 11

Various formulations are prepared in order to be used as concrete coats.

The procedure is as follows: the monomers and the poly(allyl glycidyl ether) of Example 1 are mixed. The peroxides, the cobalt naphthenate and the N,N-dimethylpara-toluidine are successively introduced with stirring. The solution obtained is poured into a dish to a thickness of 5 mm and the setting times and the TFT ("tack-free time") are examined, and then, after ageing for 10 days in an ambient atmosphere, the Shore A hardness at 15 seconds and 45 seconds is measured.

The compositions and the results are specified in table 2 below.

the solution thus prepared can be uniformaly distributed over one of the concretes of Examples 1 to 6 using a scraper.

TABLE 2

| EXAMPLES | 7 (comparative) | 8 | 9 | 10 | 11 |
|---|---|---|---|---|---|
| Composition: monomer(s) A + oligomer B (in parts) | | | | | |
| DCPOEXA | 5 | 4 | 3 | 3 | 3 |
| Poly(allyl glycidyl ether) of Example 1 | — | 1 | 1 | 1 | 1 |
| ISOBORMA | | | 1 | | |
| NONMA | | | | 1 | |
| TMPTMA | | | | | 1 |
| System C (as percentage by weight with respect to the above composition A + B) | | | | | |
| 40% Dibenzoyl peroxide, marketed under the name "Cadox 40E" by the Com- | 0.6 | 0.6 | 0.6 | 0.6 | 0.6 |

TABLE 2-continued

| EXAMPLES | 7 (comparative) | 8 | 9 | 10 | 11 |
|---|---|---|---|---|---|
| pany Akzo | | | | | |
| Cumene hydroperoxide | 1.3 | 1.3 | 1.3 | 1.3 | 1.3 |
| Cobalt naphthenate | 0.3 | 0.3 | 0.3 | 0.3 | 0.3 |
| N,N-Dimethyl-para-toluidine | 0.3 | 0.3 | 0.3 | 0.3 | 0.3 |
| Beginning of setting | progressive | 15 min | progressive | progressive | progressive |
| End of setting | 30 min | 35 min | 29 min | 93 min | 29 min |
| TFT | 15 h | 3 h | 3 h 15 min | 4 h | 3 h 45 min |
| Shore A hardness | | | | | |
| at 15 seconds | 97.2 | 83.5 | 92 | 47.8 | 92.8 |
| at 45 seconds | 97.2 | 75.8 | 92 | 36.3 | 92.8 |

The preceding examples can be repeated with similar success by substituting generically or specifically described reactants and/or operating conditions of this invention for those used in the preceding examples.

The entire disclosure of all applications, patents and publications, cited above and below, and of corresponding French application 95/04466, are hereby incorporated by reference.

From the foregoing description, one skilled in the art can easily ascertain the essential characteristics of this invention, and without departing from the spirit and scope thereof, can make various changes and modifications of the invention to adapt it to various usages and conditions.

What is claimed is:

1. A composition intended to be used as binder in the preparation of synthetic resin concretes or mortars or as bonding primer or as finishing coat, formed from (A) a system of monomers comprising:
        (a1) 50 to 90 parts by weight of a dicyclopentenyloxyalkyl ester of formula (I):

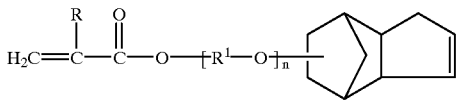

(I)

in which
    R represents H or CH$_3$;
    n has the value 1 or 2; and
    R$^1$ represents a C$_2$–C$_6$ alkylene group;
        (a2) 0 to 25 parts by weight of at least one (meth) acrylate giving a homopolymer in which the glass transition temperature is greater than the glass transition temperature of a homopolymer of the ester (a1);
        (a3) 0 to 25 parts by weight of at least one (meth) acrylate giving a homopolymer in which the glass transition temperature is lower than the glass transition temperature of a homopolymer of the ester (a1);
        (a4) 0 to 25 parts by weight of at least one monomer having at least two (meth)acrylic unsaturations; and
    (B) 5 to 30 parts by weight of at least one poly(allyl glycidyl ether).; and
    (C) an initiating system:
        (C1) 0.1 to 3 parts by weight of at least one organic peroxide derived from a C$_3$–C$_{18}$ hydrocarbon compound and 0.1 to 2 parts by weight of at least one aromatic amine;
        (C2) 0.1 to 3 parts by weight of at least one organic hydroperoxide derived from a C$_3$–C$_{18}$ hydrocarbon compound and 0.0005 to 2 parts by weight of at least one polyvalent metal salt;
        (C3) a mixture of (C1) and of 0.0005 to 2 parts by weight of at least one polyvalent metal salt; or
        (C4) a mixture of (C1) and (C2), all the amounts being given per 100 parts by weight of (A)+(B).

2. A composition according to claim 1, characterized in that the dicyclopentenyloxyalkyl ester (a1) is dicyclopentenyloxyethyl methacrylate.

3. A composition according to claim 1 and characterized in that the (meth)acrylates (a2) are isobornyl methacrylate, isobornyl acrylate or tert-butylcyclohexyl methacrylate.

4. A composition according to claim 3, characterized in that the (meth)acrylates (a3) are chosen from ethyltriglycol methacrylate, lauryl acrylate, stearyl acrylate, nonyl methacrylate, nonyl acrylate, lauryl methacrylate or stearyl methacrylate.

5. A composition according to claim 4, characterized in that the monomers (a4) are trimethylolpropane trimethacrylate, trimethylolpropane triacrylate, bisphenol A dimethacrylate, butanediol dimethacrylate, hexanediol dimethacrylate, tripropylene glycol dimethacrylate or the dimethacrylate of bisphenol A diglycidyl ether.

6. A composition according to claim 5, characterized in that the poly(allyl glycidyl ether)s (B) are those represented by formula (II).

7. A composition according to claim 6, characterized in that the organic peroxides forming part of the formulation of the initiating systems (C1), (C3) and (C4) are dibenzoyl peroxide, tert-butyl perbenzoate, 2,2-bis(tert-butylperoxy) butane tertbutylperoxy isopropyl carbonate.

8. A composition according to claim 6, characterized in that the hydroperoxides forming part of the formulation of the initiating systems (C2) and (C4) are cumene hydroperoxide, tert-butyl hydroperoxide, methyl ethyl ketone hydroperoxide or 2,5-dimethyl-2,5-bis(hydroperoxy) hexane.

9. A composition according to claim 6, characterized in that the aromatic amines forming part of the formulation of the initiating systems (C1), (C3) and (C4) are N,N-dimethylaniline, N,N-dimethylpara-toluidine or para-(N,N-dimethylamino)benzaldehyde.

10. A composition according to claim 6, characterized in that the polyvalent metal salts forming part of the formulations of the initiating systems (C2), (C3) and (C4) are salts of C$_4$–C$_{30}$ carboxylic acids, in particular naphthenates and octoates of cobalt (II), of potassium, of calcium, of zirconium, of nickel or of manganese, and their mixtures.

11. A composition according to claim 6, characterized in that it is provided in the form of a two-component system in which the components have to be mixed at the time of use.

12. A composition according to claim 11, characterized in that one of the components is composed of the system of monomers (A) and of tertiary amine(s) and/or the metal salt(s) of the initiating system (C), and the other component, of the poly(allyl glycidyl ether)(s) (B) and of the peroxide(s) and/or the hydroperoxide(s) of the initiating system (C).

13. A synthetic resin mortar or concrete composition comprising inert organic fillers and a binder, characterized in that the binder has the composition defined in claim 6.

14. A composition according to claim 13, characterized in that it comprises, per 100 parts by weight:
   10 to 25 parts of the binder; and
   90 to 75 parts of the fillers.

15. A composition according to claim 14, characterized in that the fillers have a particle size of between 100 µm and 9.5 mm and are sand, gravel, silica, calcium carbonate or Portland cement.

16. A finishing coat composition, intended to be applied in particular on concretes or porous materials, comprising the composition as defined in claim 6, optionally as a mixture with at least one inorganic or organic pigment.

17. A synthetic resin mortar or concrete composition comprising inert organic fillers and a binder, wherein the binder has the composition defined in claim 1.

18. A self-levelling resin mortar or concrete obtained from the composition as defined in claim 17.

19. A composition according to claim 1, wherein the amount of (a2), (a3) and (a4) is zero.

20. A composition according to claim 1, wherein the parts by weight of (a1) is higher than the total parts by weight of (a2), (a3), (a4) and (B).

21. A composition according to claim 1, wherein the composition consists essentially of (A), (B) and (C).

22. A compound according to claim 1, wherein (meth) acrylates (a3) are (meth)acrylates possessing a linear or branched alkyl chain having 12 or more carbon atoms.

23. A compound according to claim 10, wherein the polyvalent metal salts are naphthenates or octoates of cobalt (II), potassium, calcium, zirconium, nickel, manganese, or mixtures thereof.

24. A composition intended to be used as binder in the preparation of synthetic resin concretes or mortars or as bonding primer or as finishing coat, formed from:
   (A) a system of monomers comprising:
      (a1) 50 to 90 parts by weight of a dicyclopentenyl-oxyalkyl ester of formula (I):

$$H_2C=\underset{R}{C}-\underset{O}{\overset{\parallel}{C}}-O-[R^1-O]_n-\text{(dicyclopentenyl group)} \qquad (I)$$

in which
   R represents H or CH$_3$;
   n has the value 1 or 2; and
   R$^1$ represents a C$_2$–C$_6$ alkylene group;
      (a2) 0 to 25 parts by weight of at least one (meth) acrylate giving a homopolymer in which the glass transition temperature is greater than the glass transition temperature of a homopolymer of the ester (a1);
      (a3) 0 to 25 parts by weight of at least one (meth) acrylate giving a homopolymer in which the glass transition temperature is lower than the glass transition temperature of a homopolymer of the ester (a1);
      (a4) 0 to 25 parts by weight of at least one having at least two (meth)acrylic unsaturations; and
   (B) 5 to 30 parts by weight of at least one poly(allyl glycidyl ether).

25. A synthetic resin mortar or concrete composition comprising inert organic fillers and a binder, wherein the binder has the composition defined in claim 24.

26. A self levelling resin mortar or concrete obtained from the composition as defined in claim 25.

27. A composition according to claim 24, wherein the system of monomers consists essentially of (A) and (B).

28. A composition intended to be used as binder in the preparation of synthetic resin concretes or mortars or as bonding primer or as finishing coat, formed from:
   (A) a system of monomers comprising:
      (a1) 50 to 90 parts by weight of a dicyclopentenyl-oxyalkyl ester of formula (I):

$$H_2C=\underset{R}{C}-\underset{O}{\overset{\parallel}{C}}-O-[R^1-O]_n-\text{(dicyclopentenyl group)} \qquad (I)$$

in which
   R represents H or CH$_3$;
   n has the value 1 or 2; and
   R$^1$ represents a C$_2$–C$_6$ alkylene group;
      (a2) 0 to 25 parts by weight of at least one (meth) acrylate giving a homopolymer in which the glass transition temperature is greater than the glass transition temperature of a homopolymer of the ester (a1);
      (a3) 0 to 25 parts by weight of at least one (meth) acrylate giving a homopolymer in which the glass transition temperature is lower than the glass transition temperature of a homopolymer of the ester (a1);
      (a4) 0 to 25 parts by weight of at least one monomer having at least two (meth)acrylic unsaturations; and
   (B) 5 to 30 parts by weight of at least one compound of formula III or IV $$H_3C-CH_2-\underset{\underset{CH_2O-[CH_2-CH_2-O]_q-CH_2-CH=CH_2}{|}}{\overset{\overset{CH_2O-[CH_2-CH_2-O]_z-CH_2-CH=CH_2}{|}}{C}}-CH_2O-[CH_2-CH_2-O]_p-CH_2-CH=CH_2 \qquad (III)$$

$$CH_2=CH-CH_2-[O-CH_2-CH_2]_n-O-CH_2-\underset{\underset{CH_2-O-[CH_2-CH_2-O]_t-CH_2-CH=CH_2}{|}}{\overset{\overset{CH_2-O-[CH_2-CH_2-O]_r-CH_2-CH=CH_2}{|}}{C}}-CH_2-O-[CH_2-CH_2-O]_s-CH_2-CH=CH_2 \qquad (IV)$$

(C) an initiating system selected from the group consisting of:
- (C1) 0.1 to 3 parts by weight of at least one organic peroxide derived from a $C_3$–$C_{18}$ hydrocarbon compound and 0.1 to 2 parts by weight of at least one aromatic amine;
- (C2) 0.1 to 3 parts by weight of at least one organic hydroperoxide derived from a $C_3$–$C_{18}$ hydrocarbon compound and 0.0005 to 2 parts by weight of at least one polyvalent metal salt;
- (C3) a mixture of (C1) and of 0.0005 to 2 parts by weight of at least one polyvalent metal salt; and
- (C4) a mixture of (C1) and (C2), all the amounts being given per 100 parts by weight of (A)+(B).

* * * * *